(12) United States Patent
Moriwaki et al.

(10) Patent No.: US 6,362,948 B1
(45) Date of Patent: *Mar. 26, 2002

(54) ELECTRONIC COMPONENT

(75) Inventors: Nobushige Moriwaki, Izumo; Kazuhiro Yoshida, Shimane-ken; Kenichi Watanabe, Izumo-Shimane-ken; Akio Shobu, Ohda; Osamu Yamaoka; Yukio Tanaka, both of Izumo, all of (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,065

(22) Filed: Jul. 8, 1999

(30) Foreign Application Priority Data

Jul. 10, 1998 (JP) .......................................... 10-196146

(51) Int. Cl.⁷ .......................... H01G 2/20; H01G 4/228; H01G 4/06
(52) U.S. Cl. .................. 361/308.1; 361/309; 361/321.2
(58) Field of Search .......................... 361/301.1, 301.3, 361/301.4, 303, 307, 308.1, 308.2, 309, 310, 311, 312, 320, 306.1, 306.2, 306.3, 321.1–321.5, 772, 773, 782, 809–811, 807

(56) References Cited

U.S. PATENT DOCUMENTS

| | | | | | |
|---|---|---|---|---|---|
| 1,900,352 | A | * | 3/1933 | Lewis | 361/308.1 |
| 3,829,738 | A | * | 8/1974 | Makihara | 361/310 |
| 4,346,429 | A | * | 8/1982 | DeMatos | 361/310 |
| 4,603,373 | A | * | 7/1986 | Lavene | 361/306 |
| 4,715,118 | A | * | 12/1987 | Bernard et al. | 29/856 |
| 5,053,916 | A | * | 10/1991 | Weekamp et al. | 361/308.2 |
| 5,576,926 | A | * | 11/1996 | Monsorno | 361/303 |

FOREIGN PATENT DOCUMENTS

| | | | | |
|---|---|---|---|---|
| JP | 2-281723 | * | 11/1990 | H01G/9/00 |
| JP | 4171911 | | 6/1992 | |

* cited by examiner

Primary Examiner—Dean A. Reichard
Assistant Examiner—Eric W. Thomas
(74) Attorney, Agent, or Firm—Ostrolenk, Faber, Gerb & Soffen, LLP

(57) ABSTRACT

A first metallic terminal plate is joined to a first side-face of an electronic chip formed by lamination of lamination-capacitors as plural electronic elements, and a second terminal plate to the second side-face of the chip. The first and second metallic terminal plates comprises first terminal plate portions joined to the first and second side-faces, respectively, and the second terminal plate portions bent along the lower edges of the first terminal plate portions toward the opposed side-faces, respectively and elongated from the range under the electronic chip to be out of the range in the width direction.

5 Claims, 3 Drawing Sheets

ELECTRONIC COMPONENT

BACKGROUND OF THE INVENTION

1. Field of the Invention

The present invention relates to an improvement in an electronic component containing an electronic chip having metallic terminal plates joined thereto, and more particularly, to an electronic component suitably for use in the form of an electronic component composed of plural electronic elements and metallic terminal plates joined thereto such as a high capacitance capacitor.

2. Description of the Related Art

Conventionally, it has been proposed that to attain a high capacitance capacitor by use of a ceramic monolithic capacitor, plural ceramic capacitors are laminated to produce a high capacitance capacitor.

Japanese Unexamined Patent Publication No. 4-171911 discloses an example of such capacitors. In such capacitor, shown in FIG. 5, a capacitor chip 56 is formed laminating a plurality of capacitors 51 through 55.

Metallic terminal plates 58 and 59 provided on the opposite side-faces of the capacitor of the capacitor chip and are adhered to the chip 56 through electroconductive joining materials 57. The metallic terminal plates 58 and 59 have terminal plate portions 58a and 59a, joined to the side-faces of the capacitor chip 56, and bent pieces 58b and 59b located at the lower ends of the terminal plate portions 58a and 59a and extending under the capacitor chip 56.

The bent pieces 58b and 59b are provided in order to facilitate the mounting of the capacitor chip 56 onto a printed circuit board or the like. The capacitor chip 56 is so fixed to the metallic terminal plates 58 and 59 at a location above the bent pieces 58b and 59b so that a gap is formed between the upper faces of the bent pieces 58b and 59b and the lower face of the capacitor chip 56.

More particularly, a substrate made of aluminum or the like, having high thermal dissipation properties, is used for mounting a circuit, for example, an IC or the like. When the above-mentioned capacitor is mounted onto such a metallic substrate, since the thermal expansion coefficient of the substrate is considerably different from that of the ceramic constituting the capacitor chip 56, it is necessary to absorb a distortion which will be caused by the difference between the thermal expansion coefficients. Accordingly, the capacitor chip 56 is fixed to the metallic terminal plates 58 and 59 in the state that they are lifted above the bent pieces 58b and 59b, as described above.

There have been proposed a variety of capacitors which have a large capacitance attained by lamination of plural lamination-capacitors as described above.

However, in the case of the conventional high-capacitance capacitor shown in FIG. 5, there is the problem that a high inductance is produced in the metallic terminal plates 58 and 59 used for mounting of the capacitor on a board. If a high inductance is produced, the electric properties of the circuit including the capacitor depart from their design values, so that the desired electrical characteristics can not be obtained.

SUMMARY OF THE INVENTION

According to the present invention, there is provided an electronic component which comprises an electronic chip having first and second side-faces, a first metallic terminal plate containing a first terminal plate portion joined to the first side-face of the electronic chip, and a second terminal plate portion bent along the edge of the first terminal plate portion toward the second side-face and elongated in a direction different from that of connecting the first and second side-faces to be out, and a second metallic terminal plate containing a first terminal plate portion joined to the second side-face of the electronic chip, and a second terminal plate portion bent along the edge of the first terminal plate portion toward the first side-face and elongated in a direction different from that of connecting the first and second side-faces to be out.

Preferably, the second terminal plate portions of the first and second metallic terminal plates are overlapped with each other through an insulating layer.

The insulating layer may be formed of an adhesive material, and the second terminal plate portions of the first and second metallic terminal plates are bonded to each other through the insulating layer.

Preferably, the electronic component further comprises a case for receiving the electronic chip.

Preferably, the electronic chip is formed of plural electronic elements laminated together.

The electronic chip may be formed of plural electronic elements arranged in the lateral direction.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DESCRIPTION OF THE PREFERRED EMBODIMENTS

Figure 1:
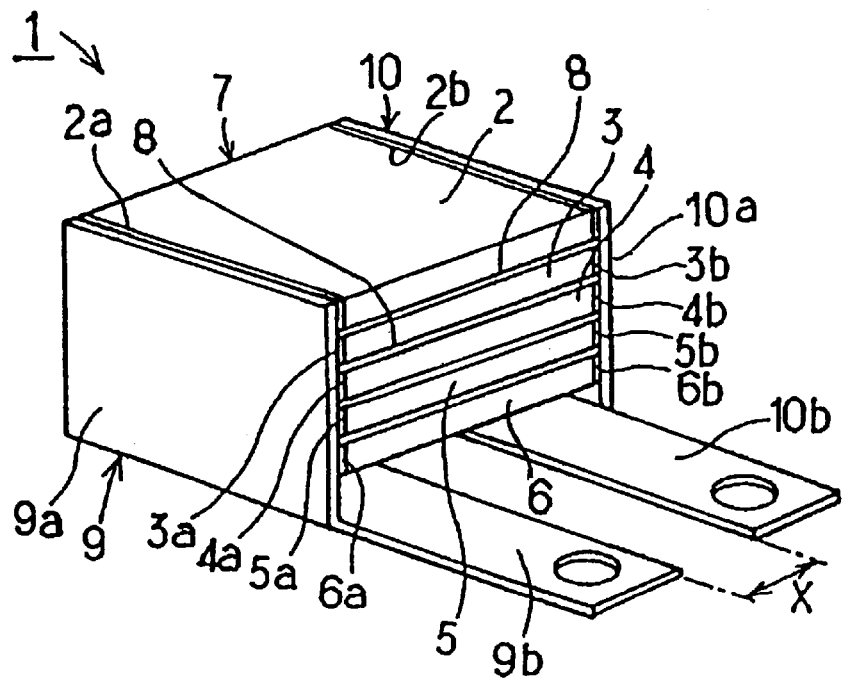
FIG. 1 is a perspective view of an electronic component according to a first embodiment of the present invention.

Referring now to FIGS. 1–4, wherein like numerals indicate like elements, there is shown in FIG. 1 a capacitor according to a first embodiment of the present invention.

A capacitor 1 contains electronic chip 7 formed by lamination and integration of plural lamination-capacitors 2 through 6. The lamination-capacitors 2 through 6 preferably each include a plurality of internal electrodes which are so formed as to overlap in the thickness direction in the dielectric ceramic sheet. On the opposite side faces of the lamination-capacitors 2 through 6, external electrodes 2a, 2b, 3a, 3b, 4a, 5a, 5b and 6a, 6b are preferably formed, respectively. They may, however, be omitted. The lamination-capacitors 2 through 6 are preferably bonded together, for example, through an insulating adhesive 8 to form the electronic chip 7. However, the electronic chip 7 may be formed by lamination of the lamination-capacitors 2 through 6 without the insulating adhesive 8 provided, and joining of the capacitors to the below-described metallic terminal plates for integration.

As referred to below, the left side-face of the electronic chip 7 as viewed in FIG. 1 (the side-face where the external electrodes 2a through 6a are formed) will be referred to as the first side-face and the right side-face as viewed in FIG.

1 (where the external electrodes 2b through 6b are formed) will be referred to as the second side-face.

A first metallic terminal plate 9 is to the first side-face of the above-described electronic chip 7 joined by use of an electroconductive joining material such as solder, an electroconductive adhesive, and the like. Any suitable material may be used.

The first and second metallic terminal plates 9 and 10 contain first terminal-plate portions 9a and 10a joined to the first and second side-faces of the electronic chip 7, respectively. The first metallic terminal plate portions 9a and 10a preferably have a rectangular plane shape with their lower edges positioning below the lower face of the electronic chip 7.

The size of each of the first terminal plate portions 9a and 10a in the width direction w is substantially equal to that of the electronic element chip 7 in the width direction.

The first metallic terminal plate 9 includes a bent second terminal plate portion 9b extending along the lower edge of the first terminal plate portion 9a toward the second side-face. The second terminal plate portion 9b is elongated in the width direction of the electronic chip 7 to extend out from under the electronic chip 7.

Similarly, the second metallic terminal plate 10 includes a second terminal plate portion 10b, which is bent along the lower edge of the first terminal plate portion 10a toward the first side-face, and extends out from under the electronic chip 7 in the width direction.

More particularly, both of the above-described second terminal plate portions 9b and 10b of the first and second metallic terminal plates 9 and 10 extend under the chip 7 in the width range of the first and second side-faces, and extend forwardly outside of the range of the chip 7 in the width direction thereof. The distance X between the second terminal plate portions 9b and 10b is much shorter than the distance between the first and second side-faces.

In the capacitor 1 of the instant embodiment, the distance X between the second terminal plate portions 9b and 10b of the first and second metallic terminal plates 9 and 10 is shortened relative to the distance between the bent pieces 58b and 59b in the prior art, thereby reducing the generation of an unnecessary inductance. On the other hand, electric currents with the opposite polarities flow in the metallic terminal plates 9 and 10, respectively. Thus, the inductances produced in the metallic terminal plates 9 and 10 are cancelled between the second terminal plate portions 9b and 10b. As a whole, the unnecessary inductances can be effectively reduced.

When the capacitor 1 of the instant embodiment is mounted onto a circuit board and is operated, the unnecessary inductances are cancelled between the above-described metallic terminal plates 9 and 10, and thereby, their desired electrical characteristics can be assuredly attained.

In the above-described embodiment, the electronic chip 7 is located so that its lower face is positioned above the upper faces of the second terminal plate portions 9b and 10b. However, as an alternative construction, the lower face of the electronic chip 7 may contact the upper faces of the second terminal plate portions 9b and 10b.

This construction is preferred. When the electronic chip 7 is lifted above the terminal plate portions 9b and 10b with a gap provided between the electronic chip 7 and the terminal plate portions 9b and 10b, thermal conduction from the circuit board on which the chip 7 is mounted is reduced and the influence of distortions caused by the difference between the thermal expansion coefficients of the board and the electronic chip 7 is inhibited.

In the above-described embodiment, the second terminal plate portions 9b and 10b are elongated to extend out from under the electronic chip 7 in the width direction. However, the second terminal plate portions 9b and 10b may extend outwardly in other directions, for example, in an oblique direction. Furthermore, in the instant embodiment, the second terminal plate portions 9b and 10b are parallel with each other. However, they do not necessarily need to be elongated in parallel with each other.

Figure 2:
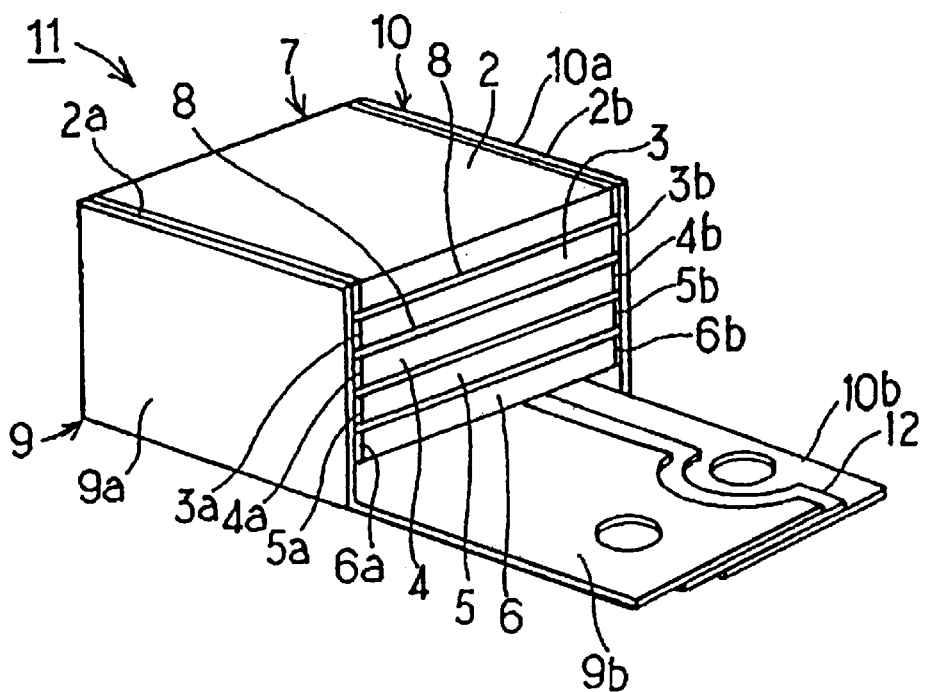
FIG. 2 is a perspective view of an electronic component according to a second embodiment of the present invention.

FIG. 2 is a perspective view of a second embodiment of the present invention. In a capacitor 11 of the second embodiment, lamination-capacitors 2 through 6 are laminated and integrated through the insulating adhesive 8, as in the first embodiment. The capacitor 11 is different from the first embodiment in the way that the second terminal plate portions 9b and 10b of the first and second metallic terminal plates 9 and 10 are configured. In other respects, the second embodiment is the same as the first embodiment. Accordingly, like parts of the second embodiment as those of the first embodiment are designated by like reference numerals, and their detailed description is omitted.

In the capacitor 11, the second terminal plate portion 9b is formed by bending of the first metallic terminal plate 9 along the lower edge of the first terminal plate portion 9a toward the second side-face side and extends beyond the electronic chip 7 in the width direction. Similarly, the second metallic terminal plate portion lob is formed by bending of the second metallic terminal plate 10 along the lower edge of the first terminal plate portion 10a toward the first second side-face side and extends out from under the electronic chip 7 in the width direction. However, the second terminal plate portions 9b and 10b of the first and second metallic terminal plates 9 and 10 overlapped one another and are separated by an insulation layer 12 provided between them. With the interposed insulating layer, the electrical insulation between the terminal plate portions 9b and 10b is ensured.

Any suitable material for the insulating layer 12 may be used. The insulting layer 12 may be formed of an appropriate material such as a synthetic resin or the like. Preferably, the insulating layer 12 is formed of an insulating adhesive, an adhesive piece such as a both-side pressure-sensitive adhesive tape, or the like, and thereby, the electric insulation between the terminal plate portions 9b and 10b can be ensured, and moreover, can be assuredly fixed as shown in the figure.

Particularly, if the insulating layer 12 is formed using a both-side pressure-sensitive adhesive tape, the terminal plate portions 9b and 10b can be easily joined, and the production process can be simplified.

Figure 3:
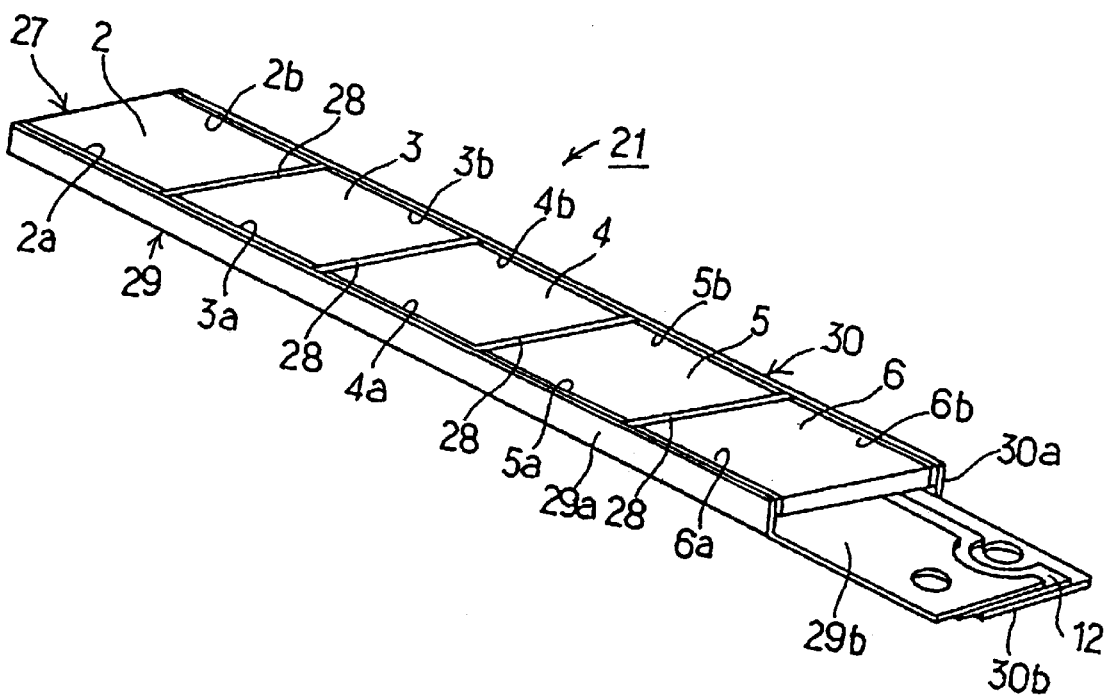
FIG. 3 a perspective view of an electronic component according to a third embodiment of the present invention.

FIG. 3 is a perspective view illustrating a capacitor according to a third embodiment of the present invention. In the capacitors 1 and 11 of the first and second embodiments, the electronic chip 7 is formed by stacking a plural lamination-capacitors 2 through 6 one atop the other. On the other hand, in a capacitor 21 shown in FIG. 3, the electronic chip 27 is formed of the plural lamination-capacitors 2 through 6 arranged in the lateral direction, adjacently to one another. The lamination-capacitors 2 through 6 are so arranged that the external electrodes 2a through 6a are positioned on the first side-face side of the electronic chip 27, and the external electrodes 2b through 6b are positioned on the second side-face side.

The lamination-capacitors 2 through 6 are joined, for example, through an insulating adhesive 28 to be integrated together. However, the insulating adhesive 28 can be omitted. For example, the lamination-capacitors 2 through 6 may be joined to metallic terminal plates 29 and 30 to be integrated. Further, as in the first embodiment, the external electrodes 2a through 6a can be omitted.

In the instant embodiment, the first and second metallic terminal plates 29 and 30 comprises first terminal plate portions 29a and 30a joined to the first and second side-faces of the electronic chip 27, and the second terminal plate portions 29b and 30b bent along the lower edges of the first terminal plate portions 29a and 30a extending toward the opposed side-faces and elongated to extend from under the electronic chip 27 in the width direction thereof.

The second terminal plate portions 29b and 30b overlapped one another through an insulating layer 12 as in the second embodiment.

In the instant embodiment, since the second terminal plate portions 29b and 30b of the first and second metallic terminal plates 29 and 30 are adjacent to each other, the inductances produced in the second terminal plate portions 29b and 30b can be effectively cancelled.

Figure 4:
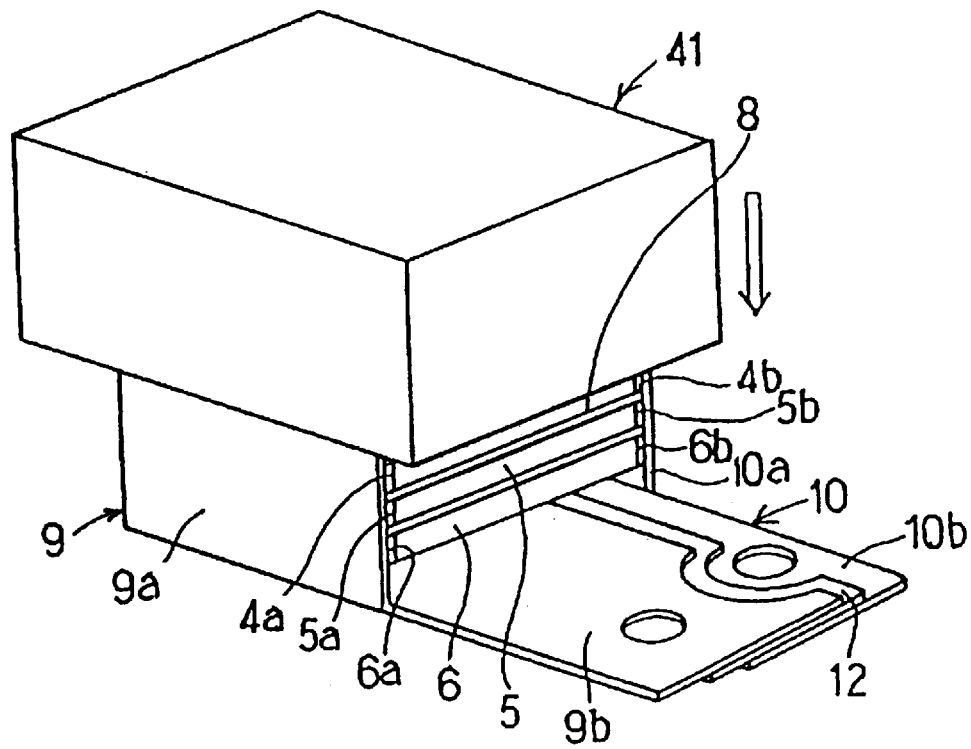
FIG. 4 is a perspective view illustrating an modified example of the embodiment of FIG. 2.

FIG. 4 is a perspective view illustrating an modified example of the capacitor 11 of the second embodiment.

In the capacitor 11 shown in FIG. 2, the first and second metallic terminal plates 9 and 10 are joined to the electronic chip 7. A case 41 may be attached by placing it over chip 7 in the direction shown by the arrow in FIG. 4. The case 41 preferably has a substantially rectangular parallelepiped shape with an opening (not shown) on the bottom side. The case 41 is so attached as to receive the electronic chip 7 through the opening of the case 41 and surround it. The case 41 may be formed of an appropriate material such as a synthetic resin or a metallic piece of which the surface is coated with an insulating material such as a synthetic resin or the like.

With the attached case 41, the capacitor 11 can be protected from breakage caused by external stress. Accidents such as an electric shock and the like can also be prevented.

The case 41 can take various forms. Preferably, the case 41 is fixed to the electronic chip 7 by casting a molten resin into the case 41 and curing the resin after the chip 7 is covered with the case 41. In this case, the impact resistance, the vibration resistance, and the weather-proof properties can be enhanced.

Figure 5:
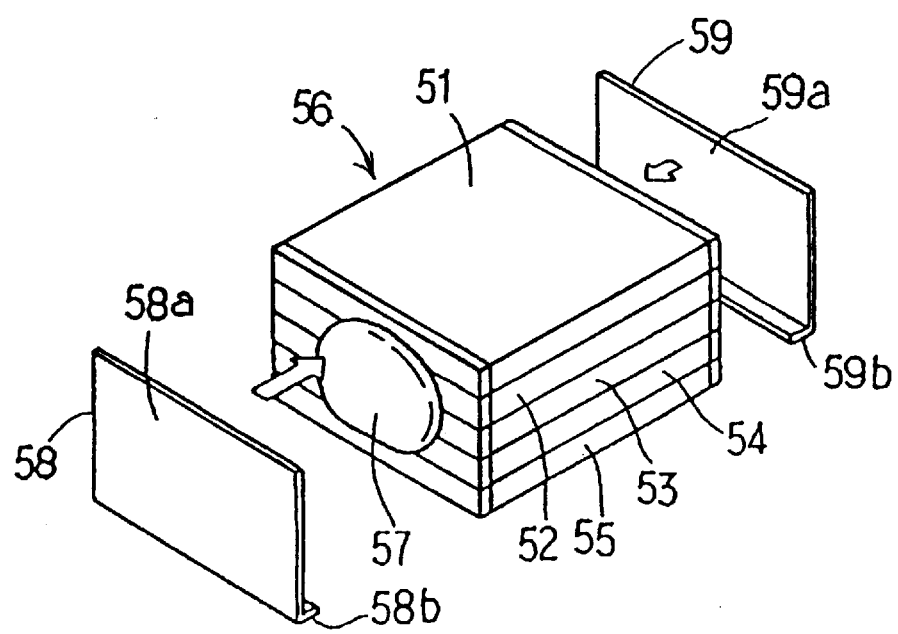
FIG. 5 is an exploded perspective view showing an example of conventional high capacitance capacitors.

As series of experiments were carried out to test the attributes of the present invention. The capacitors 1 and 11 of the first and second embodiments were produced using an electronic chip 7 having an outside size in the direction of connecting the first and second side-faces of 40.0 mm, a size in the width direction of 54 mm, and a thickness of 5.0 mm. The inductance components, due to the metallic terminal plates 9 and 10, were 13.4 nH and 8.4 nH, respectively. This establishes that the inductance components are considerably reduced as compared with the inductance components due to the metallic terminal plates 58 and 59 of 27.9 nH of the conventional capacitor shown in FIG. 5, produced using of the same electronic chip 7.

In the above-described modified example of the first, second, and third embodiments, for the electronic chip, a plurality of lamination-capacitors were used. However, the present invention is not restricted to a capacitor, and may be applied to general electronic components each containing plural, different ceramic electronic elements such as a varistor, an inductor, and the like. Furthermore, the electronic chip according to the present invention may be formed of at least two different types of ceramic electronic elements.

In the electronic component of the present invention, the second terminal plate portions of the first and second metallic terminal plates are bent along the edges of the first terminal plate portions toward the second and first side-faces and are elongated in a different direction to extend outward from under the ceramic component. Thus, the distance between the second terminal plate portions is shorter than the distance between the first and second side-faces. Accordingly, the inductances produced in the second terminal plate portions cancelled each other between the second terminal plate portions of the first and second metallic terminal plates. When the electronic component is mounted on a board or the like, an unnecessary inductance can be effectively reduced, and thereby, its desired electrical characteristics can be attained.

Preferably, the second terminal plate portions of the first and second metallic terminal plates overlap one another through the insulating layer. Accordingly, the electric insulation between the second terminal plate portions of the first and second metallic terminal plates can be ensured, and moreover, the distance between the second terminal plate portions of the first and second metallic terminal plates can be further shortened thereby further decreasing an unnecessary inductance.

Preferably, as the insulating layer, an adhesive material is used, and the second terminal plate portions of the first and second metallic terminal plates are bonded to one another through the adhesive material. Thus, the reliability of the electric insulation between the second terminal plate portions of the first and second metallic terminal plates can be enhanced, and the impact resistance or the like can be increased.

Preferably, the electronic component further is provided with a protective the case for receiving the electronic chip, enhancing resistance to mechanical impacts contributing to the prevention of accidents such as an electric shock and the like.

Preferably, the electronic chip is formed of plural electronic elements laminated together. Thus, the height occupied by the electronic component can be inhibited. That is, an electronic apparatus of which the height is low can be realized.

The present invention may be embodied in other specific forms without departing from the spirit or essential attributes thereof and, accordingly, reference should be made to the appended claims, rather than to the foregoing specification, as indicating the scope of the invention.

What is claimed is:

1. An electronic component comprising:

an electronic chip having first and second side-faces, a first metallic terminal plate containing a first terminal plate portion joined to the first side-face of the electronic chip, and a planar second terminal plate portion bent along the edge of the first terminal plate portion in a first direction toward the second side-face and elongated in a second direction different than the first direction so as to extend beyond the electronic chip; and a second metallic terminal plate containing a first terminal plate portion joined to the second side-face of the electronic chip, and a planar second terminal plate portion bent along the edge of the first terminal plate portion in a third direction opposite to the first direction toward the first side-face and elongated in a fourth direction different than the third direction so as to extend beyond the electronic chip, the planes of said first and second metallic terminal plates lying in a single plane and defining a mounting surface adapted to be surface mounted on a circuit board.

2. An electronic component according to claim 1, further comprising a case for receiving said electronic chip.

3. An electronic component according to claim 1, wherein said electronic chip is formed of a plurality of electronic elements laminated together.

4. An electronic component according to claim 1, wherein said electronic chip is formed of plural electronic elements arranged in the lateral direction and adjacent to one another.

5. An electronic component according to claim 1, wherein all of said electronic component is located on one side of said single plane.

* * * * *